April 19, 1960  J. A. JERMAN  2,933,105
ARTICLE HANDLING AND WORKING APPARATUS
Original Filed Sept. 26, 1950
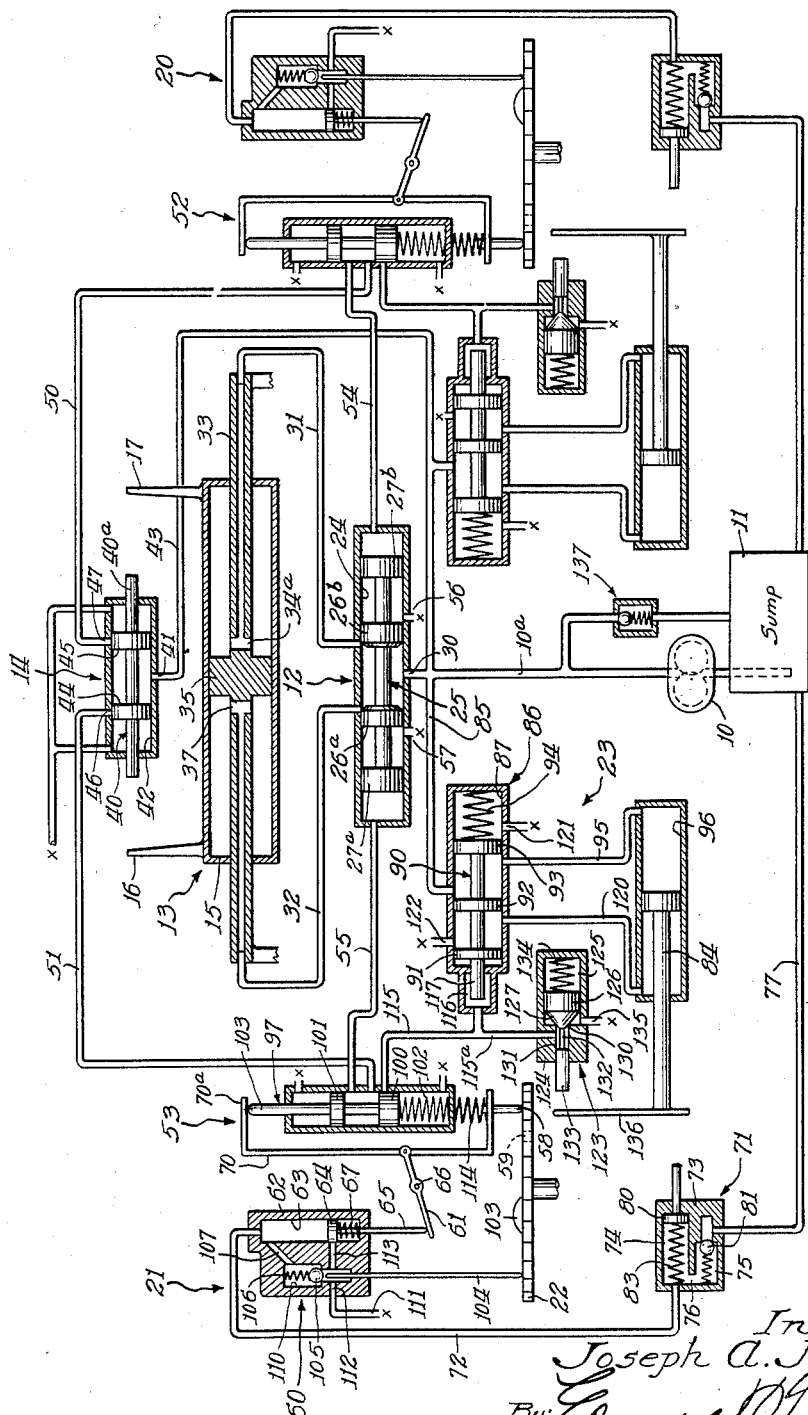
Inventor:
Joseph A. Jerman
By: Edward A. Hitzhaugh
Atty.

United States Patent Office 2,933,105
Patented Apr. 19, 1960

2,933,105

ARTICLE HANDLING AND WORKING APPARATUS

Joseph A. Jerman, Cleveland, Ohio, assignor to Borg-Warner Corporation, Chicago, Ill., a corporation of Illinois Original application September 26, 1950, Serial No. 186,803. Divided and this application November 7, 1955, Serial No. 547,887

11 Claims. (Cl. 137—622)

This application is a division of application Serial No. 186,803, filed by Joseph A. Jerman on September 26, 1950, entitled Article Handling and Working Apparatus, and now abandoned.

This invention relates to article handling and working apparatus, and more particularly to apparatus for automatically baling hay.

With the development of mechanized agricultural equipment, it has become the practice to employ apparatus operable by one person which is capable of automatically baling hay. Such apparatus is ordinarily mounted on or pulled by a tractor-like vehicle and as it is driven over the fields, the cut hay is gathered and packed into bales which are then tied automatically by the equipment, the bales being dumped on the field or loaded on a truck as they are finished. Heretofore, such apparatus as has been available has been mechanically operated, employing a mechanically reciprocated plunger to pack the hay and mechanically operated apparatus to effect the tying of the hay bales. Such apparatus is heavy and relatively slow in operation.

An object of the present invention is to provide a new and improved article handling and working apparatus and more particularly a new and improved hay baling apparatus.

A further object of the present invention is to provide a hydraulically actuated hay baling apparatus of novel design and increased efficiency.

In accordance with one embodiment of this invention, a hydraulically actuated hay baling apparatus may be provided comprising a double-acting piston arranged to perform a packing operation at each stroke, thus packing two bales at a time. Synchronized with the operation of the piston and controlled by the desired ultimate size of the hay bale is a pair of hay tying mechanisms comprising needles hydraulically actuated to complete the tying of a bale at the time the bale reaches the desired size. A feature of the present invention is that the bale is maintained under full hydraulic packing pressure during the tying operation. A particular advantage of the present invention is that by virtue of the use of hydraulic force considerably tighter bales may be produced than is possible with mechanically actuated machinery and, also, the speed of operation is several times faster than that of any heretofore available hay-baling equipment.

Other objects and advantages of the present invention will be apparent from the following detailed description taken in conjunction with the drawing, wherein the single figure is a schematic view of a hydraulically actuated hay-baling apparatus constructed in accordance with one embodiment of this invention.

Referring now to the drawings, it will be seen that the system includes a source of hydraulic pressure 10, which may be an intermeshing gear type pump, and which is connected to a sump 11 containing a suitable quantity of hydraulic fluid. The output pressure of the pump 10 is applied through an open center, control valve 12 to one or the other end of a packing plunger assembly designated generally at 13, in accordance with the position of control valve 12. The position of control valve 12 is hydraulically controlled in turn by a mechanically shifted pilot valve 14 which is operated by cylindrical packing plunger 15 of the packing assembly 13. Packing plunger 15 is arranged to be double acting and at the end of each stroke effects a packing of hay into a bale, a suitable packing plate and hay receptacle (not shown) being provided at either end of the packing plunger assembly. Affixed to either end of the packing plunger 15 are upstanding fingers 16 and 17, respectively. These fingers alternately shift the position of pilot valve 14 to effect reversal of pressure on the reciprocating plunger 15 by applying pressure alternately to the two ends of the hydraulically shifted control valve 12.

As soon as one of the two bales being packed reaches the desired size, that bale is automatically tied by tying mechanism associated with this apparatus. In the present arrangement in which two bales are packed at a time two separate tying mechanisms designated generally at 20 and 21 are provided for tying the bales. The mechanism 20 is located at the right side of the drawing and the mechanism 21 at the left. The operation of both mechanisms is identical, and for the purpose of this description only that of the left mechanism need be set forth in detail.

Upon the left bale reaching the desired size, the reciprocation of the packing plunger 15 is stopped with the packing plunger under full hydraulic pressure and thereby the bale also maintained under full packing pressure. In the arrangement illustrated, a star wheel 22 senses the size of the left bale and at the desired point locks the control valve 12 and at the same time actuates a needle piston assembly 23 to effect tying of the bale. At the completion of the tying operation, the apparatus is automatically reset and the plunger 15 continues then to reciprocate until another bale reaches the desired size for tying, at which time the reciprocation is again stopped and the tying operation performed. Once started, the operation of the hay baler is entirely automatic and it is necessary only for the operator to maintain a continuous supply of hay to be baled to the mechanism. Operation of the mechanism is stopped by shutting off the pump 10.

*Detailed Description*

Referring now in detail to the arrangement of the drawings, it will be seen that the output of pump 10 is applied through pump discharge line 10a to the plunger control valve assembly 12. Plunger control valve assembly 12 comprises a valve chamber 24 in which is slidably journalled a hydraulically shifted balanced spool valve 25. Spool valve 25 has a first or inner pair of spaced lands or valving surfaces 26a and 26b which control application of pressure to an exhaust of pressure from the packing plunger 15. A second pair of lands 27a and 27b formed at the outer end of the spool valve 25 provide piston surfaces responsive to application of pressure under the control of pilot valve assembly 14 to effect shifting, to the right or to the left, respectively, of the plunger control valve 25. Port 30 through which pressure from the line 10a, connected to the hydraulic power source 10, is admitted to valve chamber 24 is located at the center of the valve housing and when the spool valve 25 is centered in the chamber 24, pressure is distributed equally to either end of the packing plunger assembly 13.

Connecting the packing plunger chamber and the control valve chamber 24 are a pair of lines 31 and 32, these lines connecting to the plunger control valve chamber 24 at points spaced from the point of connection of line 10a. The points of connection of lines 31 and 32 to the control valve chamber are located so that when the spool valve 25 is centered, an open center connection is afforded to both of these passages and to the pressure source 10, but when the spool valve 25 is shifted either to the right or to the left by application of pressure to the right or left end thereof, one of the passages is placed in communication with the sump 11, while the other remains in communication with the pressure source.

The right line 31 communicates pressure axially through the right end portion of a fixed, tubular stem or shaft 33 and short radial passages 34a to the right side of the interior of the cylindrical plunger 15. The center portion 35 of shaft 33 is solid and is widened or flanged to provide a journal support for the reciprocable, hollow plunger 15. Similarly, the left line 32 communicates pressure axially through the left, tubular, end portion of shaft 33 and short, radial passages 37 to the left side of the interior of chamber 13. When pressure is directed through the right line 31, the packing plunger moves to the right and when pressure is directed through left line 32, the packing plunger moves to the left. When pressure is directed through line 31, the line 32 serves as an exhaust line and, vice versa, when pressure is directed through line 32, line 31 serves as an exhaust line.

The pilot valve assembly 14, which controls the operation of plunger control valve 12, comprises a mechanically shifted, balanced spool valve 40 with open center connection to pump pressure through a port 41 formed in the pilot valve chamber 42 side wall and pressure supply line 43. Line 43 connects to pump discharge line 10a ahead of control valve 12 and thus so long as pump 10 is operating supplies pressure to pilot valve 14. Spool valve 40 has two spaced lands or valving surfaces 44 and 45, respectively, and two outlet ports 46 and 47 located so that only one outlet port may be placed in communication with pump pressure at a time. The valve 40 may be initially manually moved to one side or to the other so that hydraulic pressure, admitted thereto through line 43, is directed either through right outlet line 50 to the right end of the packing plunger control valve 12 or through left outlet line 51 to the left end of control valve 12.

The discharge lines 50 and 51 of pilot valve 14 are actually connected to the two respective ends of the control valve 12 through needle control valve pilot valve assemblies 52 and 53 associated with the right and left needle actuating mechanisms 20 and 21, respectively, and communication is afforded only when these valves 52 and 53 are in their raised or upper position, as will be explained more fully hereinafter. A further line 54, when the valve assembly 52 is in its normal or upper position, then communicates pressure from the pilot valve 14 to the right end of control valve 12 through pilot valve assembly 52. Similarly, the line 51 connects through pilot valve assembly 53 associated with the left needle control mechanism 21, when this valve is in its normal upper position, with line 55 connecting to the left end of valve chamber 24.

Application of pressure from pilot valve 14 to one or the other end of valve 12 causes an immediate shifting of the spool valve 25. Thus, for example, if the pilot valve 14 is shifted to the right which may, as aforesaid, be initially effected manually, thus placing the line 50 in communication with hydraulic pressure and in turn communicating pressure to line 54 to shift the plunger control valve 25 to the left, then hydraulic pressure is no longer applied through the line 31 to the right end portion of plunger 15 but is only applied through line 32 to the left end of plunger 15. As a result, packing plunger 15 is shifted to the left. Meanwhile, hydraulic fluid trapped in the right portion of the plunger 15 is exhausted and returned to the sump through the line 31 which is now placed in communication with the sump return line by virtue of the shifting of land 26b to the left of the port communicating line 31 to the chamber 24 of control valve 12. Sump return port 56 is then in communication with line 31.

Conversely, when the plunger 15 reaches the end of its stroke to the left, the pilot valve 14 will be shifted by the finger 17 contacting the exposed right extension 40a of the pilot valve stem thereby shutting off the supply of pressure to the right end of the control valve 12 and simultaneously applying pressure to the left end of the control valve 12 through lines 51 and 55. This causes an immediate shift of the control valve to the right, thereby placing the line 31 in communication with pump supply pressure and at the same time placing line 32 in communication with the sump through sump return port 57 formed in the control valve chamber to the left of land 26a, as viewed in the drawing.

This oscillating or reciprocating action continues so long as is required to pack a bale of the required size. It will be understood that a number of strokes may be required to achieve this. When, however, the star wheel 22, associated with the left needle control mechanism has been rotated sufficiently to indicate that a bale of the desired size has been reached, the left needle control valve mechanism 53 is then actuated to stop the reciprocation of the packing plunger for a sufficient period to permit tying the bale, while maintaining full hydraulic pressure on the packing plunger. The spokes of the star wheel 22 protrude into the path of the hay and the wheel is thus turned as the hay is packed into bales, until a detent 58 associated with the pilot valve assembly 53 drops into an aperture or slot 59 formed in the star wheel 22, thereby permitting the pilot valve to shift downwardly to lock the control valve 12 and energize needle piston assembly 23.

Immediately to the left of the needle control valve pilot valve assembly 53, controlling the operation of the needle actuating mechanism, is a cam release and check valve assembly designated generally at 60. Through a lever 61, this valve mechanism controls in combination with the star wheel 22 the operation of the pilot valve assembly 53. In more detail, the cam release and check valve assembly 60 comprises a housing 62 having a plunger chamber 63 formed in the right side thereof and a piston or plunger 64 slidably journalled therein. Piston shaft 65 of piston 64 extends downwardly outside of housing 62 and the lower end thereof bears against the left end of lever arm 61, which arm is pivoted substantially at its mid point on pivot 66. A spring 67 mounted between the under side of piston 63 and the base of chamber 62 normally urges the piston upwardly.

It will be evident that upward movement of piston 64 will permit lever arm 61 to pivot in a clockwise direction. However, such upward movement does not cause lever arm 61 to pivot in a clockwise direction since there is no linking connection between the lower end of the piston shaft 65 and the left end of the lever arm. When the piston 64 is in its raised position, thus, the detent 58, which is supported on a U-shaped frame 70, at the lower end of the frame, may drop into the aperture 59 formed in the star wheel disc 22, provided, of course, the aperture 59 is aligned with detent 58 by virtue of rotation of the star wheel 22. Frame 70 is connected to the right end of lever arm 61 and when the frame is lifted by downward movement of piston 64 pivoting lever arm 61 in a counterclockwise direction the detent is raised above the star wheel disc 22 and prevented from thereafter entering aperture 59 until the lever arm 61 is released.

The piston 64 is a part of a closed hydraulic system including what may be termed a single acting, piston pump assembly 71, which supplies the pressure required to move piston 64 downwardly, the piston pump assembly 71 being connected to the piston chamber 63 by a line 72. The piston pump assembly 71 comprises a housing 73 having a pumping chamber 74 formed in the upper side thereof and a ball check valve chamber 75 formed in the lower side thereof, the two chambers being connected by a short passage 76 formed in the left side of housing 73. Chamber 75 is connected through line 77 to the oil supply sump 11 and upon movement of pump piston 80 to the right in chamber 74, hydraulic fluid is drawn into chamber 74 from the sump 11 through a spring-pressed ball check valve 81, which opens in response to the suction produced by pump piston 80. Check valve 81 is located in chamber 75. The spring associated with check valve 81 is made very light as compared with check valve spring 106, described hereinafter, and thus valve 81 opens very readily to permit refilling the system. Then, upon movement of pump piston 80 to the left, check valve 81 immediately seats and pressure is communicated to the chamber 63 to force the plunger 64 downwardly, thus pivoting the lever arm 61 in a counterclockwise direction.

Pump piston 80 is normally urged to the right by spring 83 positioned in chamber 74 between the left side of the piston 80 and the right side of the left end wall of the chamber 74, but at the start of operation of the hay baling apparatus of this invention, the pump piston 80 is immediately pushed to the left to lower the piston 64 and thereby to raise the detent 58 to permit turning of the star wheel and at the same time to shift pilot valve 53 to its upper position so as to be ready to communicate pressure to the left end of plunger control valve 12 when pilot valve 14 is in its left position. It will be understood that an identical operation occurs with the right control assembly 52 and associated parts.

This initial shifting of the pump piston 80 to the left, in the case of the left control mechanism, is effected by leftward shifting of the needle actuating piston 84 of the left needle piston assembly 23. Immediately upon the pump 10 developing pressure, this pressure is communicated through a line 85 connected at one end to line 10a at the same point as the line 43, that is, ahead of the valve 12, and at its other end to a needle piston control valve assembly 86 and more particularly to valve chamber 87 thereof. Needle piston control valve assembly 86 comprises a spool valve 90 having three spaced lands 91, 92 and 93 formed thereon. The valve 90 is normally shifted to the left and maintained in this position by spring 94, the left end of which bears against the right side of land 93 and the right end of which spring bears against the inner side of the right end wall of the valve housing. In this position, supply pressure from the pump 10 is communicated through the line 85 and through the annular chamber defined by the lands 92 and 93 to the right outlet line 95 which communicates with the right end of piston chamber 96 in which is journalled the needle actuating piston 84. This pressure is effective to shift piston 84 to the left and thereby to actuate pump piston 80. A similar operation occurs, of course, with the right mechanism and at the same time.

In addition to raising detent 58 above the star wheel 22 and thus preparing star wheel 22 for rotation in response to baling of the hay, lifting of the detent supporting frame or bracket 70 permits a spool type valve 97 of the pilot control valve assembly 53 to rise to its upper position in which position communication is afforded between the lines 51 and 55. More particularly, spool valve 97 comprises a pair of spaced lands 100 and 101. These lands are so spaced from each other and located with respect to the points of connection of lines 51 and 55 and a line 115 to be described hereinafter, that when the valve is in position to afford communication between lines 51 and 55, line 115 is shut off and, on the other hand, when the valve is in its lower position, communication is afforded only between line 51 and line 115, line 55 being then shut off to lock control valve 12 in position. A spring 102 having its upper end bearing against the lower side of land 100 and its lower end bearing against the base of the valve housing urges the spool valve 97 upwardly, and an extension 103 of the spool valve 97 protrudes above the end of the spool valve housing and bears against the lower side of upper cross-portion 70a of bracket 70, being held in this relation by spring 102. Thus, upon the bracket 70 moving upwardly in response to downward movement of piston 64, the spool valve is immediately moved upwardly by the spring 102.

Immediately upon the star wheel 22 rotating in response to bailing of the hay past the position where slot 59 is aligned with detent 58, a cam 103 mounted on the upper side of the star wheel is caused to engage the lower end of a push rod 104 whereby a ball check valve 105, associated with the cam release and check valve assembly 60, is unseated to cause discharge or dumping of the pressure against the piston 64 to permit the piston to rise and thus to prepare the lever arm 61 for rotation in a clockwise direction upon the detent 58 becoming later aligned with the aperture or slot 59 in the star wheel 22. It will be evident that unless some such provision were made, the detent 58 could not drop into the hole 59 at the proper time. As the cam 103 pushes the push rod 104 upwardly and unseats the ball check valve 105, which is normally urged into closed position by spring 106, pressure in chamber 63 is released through an angularly, downwardly extending passage 107 communicating at its upper end with the upper end of chamber 63 and at its lower end with the high pressure side of the ball check valve chamber 110. Sump return line 111 communicates through passage 112 to the low pressure side of the ball check valve chamber 110 and an extension 113 of sump return passage 112 communicates with the lower end of the chamber 63 to prevent hydraulic blocking of the movement of piston 64 therein.

After the pressure in chamber 63 has been released, as just explained, upon a bale of hay of the desired size being packed, as indicated by the rotation of star wheel 22 and the ultimate alignment of aperture 59 with the lower end of detent 58, the detent 58 will drop into aperture 59, detent 58 being urged downwardly by spring 114 positioned between the upper side of the lower arm 70b of frame 70 and the under side of the valve housing 53. Spring 114 is made considerably heavier than spring 102 which urges the spool valve 97 upwardly; consequently the spring 114 is effective to move the frame 70 downwardly and at the same time to shift the valve 97 against the pressure of spring 102, to its lower position. In this lower position, a pressure path is provided from the line 51 through the annular passage defined by lands 100 and 101 and the valve chamber to the line 115, which line 115 communicates with the left end of chamber 87 of the needle piston control valve 86.

Referring again to the control valve 86, it will be seen that the left end of chamber 87 is reduced to form a pressure or piston chamber 116 into which, from the right side thereof, protrudes an extension 117 of the spool valve stem. This extension forms a piston and when pressure is communicated to the chamber 116 by virtue of the downward shifting of spool valve 97 of the pilot valve assembly 53, the piston 117 is effective to shift the spool valve 90 of the needle actuating piston control valve 86 to the right against the pressure of spring 94. In its right position a passage is afforded to the line 120 which connects to the left end of chamber 96 of piston 84 from the pressure supply line 85. It will be evident that when the valve 90 is shifted to the right, the land 92 is then positioned to the right of the discharge end of line 85. Also, it will be evident that by sufficiently shifting the valve 90 to the right, a passage will be afforded to a sump return line 121, connected to the lower right side of the chamber 87, through the right open portion of the spool valve 90, that is, the portion lying between the two lands 92 and 93, and thus pressure liquid in the right side of chamber 96 may be exhausted to the sump, as the piston 84 is moved to the right. A similar arrangement is made for exhausting fluid from the left side of chamber 96 when pressure is supplied to chamber 96 through the line 95. Thus, in the position of the spool valve 90 shown in the drawing, a return passage is afforded through line 120 and the left open portion of valve 90 to sump return line 122 connecting to the upper side of the left end of chamber 87.

As explained hereinbefore, immediately after the start of operation of this apparatus and while the pilot control valve 53 is in its upper position, the needle actuating piston 84 is in its extreme left position. Thus, upon admission of pressure liquid to the piston end 117 of the spool valve 90 and reversal of pressure on the piston 84, the piston is moved to the right. Through suitable mechanism (not shown) this effects a tying of the bale.

In order to return the piston 84 to its left position, there is provided an unloading valve 123 whereby pressure in the chamber 116 is dumped at the conclusion of the right stroke of piston 84 so that needle piston control valve 90 may be shifted to the left again by spring 94. Unloading valve 123 comprises a valve housing 124 having a valve chamber 125 formed therein at the right end thereof in which is journalled a valve member 126. The valve member 126 has a conically tapered left portion 127 which conically tapered portion, when seated, engages at its outer periphery a valve seat 130 formed at the right end of a second chamber 131 of substantially less diameter than chamber 125 but axially aligned therewith. An intermediate valve stem portion 132 of smaller diameter than chamber 131 connects at its right end with the apex portion of the conical portion 127 and a terminal left portion 133 of the valve stem is journalled in a further reduced diameter left portion of chamber 131. A first, annular, pressure responsive surface is thus formed at the right end of the journal portion 133 of the valve stem and a second, but oppositely disposed, pressure responsive surface is formed by the portion of the conical surface 127 lying between the valve seat 130 and the intermediate reduced portion 132 of the valve stem. Pressure is normally supplied to these two areas simultaneously from a continuation 115a of line 115 and since they are of equal effective extent, the pressure is balanced and no shifting force is exerted on the valve. In this condition, a spring 134 disposed in the right side of chamber 125 with its left end against the right end of the valve member 126 is effective to hold the valve 126 seated. Chamber 125 is communicated to the sump through sump return line 135 and is, therefore, under no pressure. However, upon finger 136 affixed to the left end of needle actuating piston 84 engaging the protruding left terminal end 133 of the valve stem to move the valve 126 to the right upon the right stroke of the piston 84 and thereby to unseat the valve member 126, the full left side area of the valve member 126 is then exposed to pressure, and since this area greatly exceeds the annular pressure area at the right end of the journal portion 133 of the valve stem, the unloading valve is thereafter held open so long as pressure is supplied through the line 115. The unloading or opening of valve 123 releases all pressure from chamber 116 and the spring 94 then shifts the needle actuating piston control valve 90 to the left, reversing the pressure on the piston 84 and causing the piston 84 to shift to its extreme left position, thereby shifting pump piston 80 to the left and moving lever actuating piston 64 downwardly to raise the valve 97 of the pilot control valve assembly 53. This in turn terminates the supply of pressure to the unloading valve 123, and the unloading valve returns to its seated position under the actuation of the spring 134. The apparatus is now ready to begin a second cycle.

In the typical operation of this device, the star wheel 22 will be rotated to a position where the aperture 59 is in alignment with the detent 58 prior to the conclusion of the stroke of the packing plunger 15 to the left. It will be understood that the star wheel 22 will not be rotated except when the packing plunger 15 is moving to the left since otherwise no hay is being moved past the star wheel. When the packing plunger is being moved to the left, then the pilot valve 40 of the plunger control valve 14 must be in its extreme right position. In this position, pressure is not available from the line 51 connecting to the pilot valve 14 for the actuation of the needle valve control valve assembly 86. However, the hydraulic pressure supplied to plunger 15 to move it to the left continues and is made sufficient to move the plunger to its extreme left position despite the fact that the bale has reached the desired size. In the extreme left position of plunger 15, the pilot valve 40 is shifted to the left by finger 17 and immediately pressure is communicated through the line 51 to the line 115 and thereby to the piston chamber 116 at the left end of the valve chamber 87 of the needle actuating piston control valve 86. During all phases of operation and particularly during the tying operation, maximum system pressure is regulated through bypass relief valve 137 connected between line 10a on the discharge side of the pump 10 and the sump 11.

While this invention has been described particularly in conjunction with the operation of the left control mechanism, it will be understood and is apparent from the drawings that the mechanism to the right of the drawings duplicates that on the left. In the ordinary operation of this apparatus, the bales are packed alternately, this is, first a left bale is packed and then a right bale is packed. It is, however, feasible for the apparatus to pack two left bales or two right bales in sequence; however, as the hay is ordinarily distributed equally to the packing plunger plates at either end of plunger 15 the operation is normally alternate. Since the respective star wheels of the right and left bale tying mechanisms are rotated only during the right and left packing strokes, respectively, of the plunger 15, it is, of course, not possible with this arrangement for both needle tying mechanisms to be operated simultaneously. During the operation of one needle tying mechanism, the other is then in normal standby condition, unaffected by the operation of the other.

Where herein the various parts of this invention have been referred to as being located in a right or a left position, or an upper or a lower position, it will be understood that this is done solely for the purpose of facilitating description and that such references relate only to the relative positions of the parts as shown in the accompanying drawings.

While but one embodiment of this invention has been shown and described, it will be understood that many changes and modifications may be made therein without departing from the spirit or scope of the invention.

What is claimed is:

1. Article working apparatus comprising sensing and control means responsive to a predetermined characteristic of the article being worked, said means including a rotatable member, detent means associated with said rotatable member, a first resilient means urging said detent means into engagement with said rotatable member, said rotatable member having an aperture formed therein to receive said detent upon alignment of said aperture and said detent whereby said detent shifts from a first position to a second position, a shiftable two-way control valve associated with said detent, and a second resilient means for urging said valve to a first position when said detent is in its first position, said first resilient means shifting said control valve to a second position when said detent is in its second position, said first resilient means being selected to exert a substantially greater shifting force on said valve than said second resilient means and said first resilient means being ineffective to shift said valve except when said detent is aligned with said aperture.

2. Article working apparatus comprising sensing and control means responsive to a predetermined characteristic of the article being worked, said means including a rotatable member, detent means associated with said rotatable member, a first resilient means urging said detent means into engagement with said rotatable member, said rotatable member having an aperture formed therein to receive said detent upon alignment of said aperture and said detent whereby said detent shifts from a first position to a second position, a shiftable two-way control valve associated with said detent, a second resilient means for urging said valve to a first position when said detent is in its first position, said first resilient means shifting said control valve to a second position when said detent is in its second position, said first resilient means being selected to exert a substantially greater shifting force on said valve than said second resilient means and said first resilient means being ineffective to shift said valve except when said detent is aligned with said aperture, and means for rendering ineffective said first resilient means.

3. Article working apparatus comprising sensing and control means responsive to a predetermined characteristic of the article being worked, said means including a rotatable member, detent means associated with said rotatable member, a first resilient means urging said detent means into engagement with said rotatable member, said rotatable member having an aperture formed therein to receive said detent upon alignment of said aperture and said detent whereby said detent shifts from a first position to a second position, a shiftable two-way control valve associated with said detent, a second resilient means for urging said valve to a first position when said detent is in its first position, said first resilient means shifting said control valve to a second position when said detent is in its second position, said first resilient means being selected to exert a substantially greater shifting force on said valve than said second resilient means and said first resilient means being ineffective to shift said valve except when said detent is aligned with said aperture, and means controlled indirectly by said control valve for rendering ineffective said first resilient means.

4. Article working apparatus comprising sensing and control means responsive to a predetermined characteristic of the article being worked, said means including a rotatable member, detent means associated with said rotatable member, a first resilient means urging said detent means into engagement with said rotatable member, said rotatable member having an aperture formed therein to receive said detent upon alignment of said aperture and said detent whereby said detent shifts from a first position to a second position, a shiftable two-way control valve associated with said detent, a second resilient means for urging said valve to a first position when said detent is in its first position, said first resilient means shifting said control valve to a second position when said detent is in its second position, said first resilient means being selected to exert a substantially greater shifting force on said valve than said second resilient means and said first resilient means being ineffective to shift said valve except when said detent is aligned with said aperture, and means for rendering ineffective said first resilient means including a hydraulically actuated plunger for raising said detent out of said aperture and means responsive to a predetermined rotation of said rotatable member for rendering ineffective said hydraulically actuated plunger.

5. An apparatus for baling hay comprising means responsive to the baling of a bale of hay of a predetermined size including a rotatable star wheel, detent means associated with said star wheel, a first resilient means urging said detent means into engagement with the surface of said star wheel, said surface having an aperture formed therein to receive said detent upon alignment of said aperture and said detent whereby said detent may be shifted by said resilient means from a first position to a second position, a shiftable, two-way control valve associated with said detent, a second resilient means for urging said valve to a first position when said detent is in its first position, said valve being shifted to a second position by said first resilient means when said detent is in its second position, said first resilient means being selected to exert a substantially greater shifting force on said valve than said second resilient means, said first resilient means being ineffective to shift said valve except when said detent is in line with said aperture, a hydraulically actuated plunger for removing said detent from said aperture to permit rotation of said star wheel, means for supplying pressure to said plunger, and an unloading valve associated with said plunger operable in response to a predetermined initial rotation of said star wheel to cause release of pressure on said plunger.

6. An apparatus for baling hay comprising means responsive to the baling of a bale of hay of a predetermined size including a rotatable star wheel, detent means associated with said star wheel, a first resilient means urging said detent means into engagement with the surface of said star wheel, said surface having an aperture formed therein to receive said detent upon alignment of said aperture and said detent whereby said detent may be shifted by said resilient means from a first position to a second position, a shiftable, two-way control valve associated with said detent, a second resilient means for urging said valve to a first position when said detent is in its first position, said valve being shifted to a second position by said first resilient means when said detent is in its second position, said first resilient means being selected to exert a substantially greater shifting force on said valve than said second resilient means, said first resilient means being ineffective to shift said valve except when said detent is in line with said aperture, a hydraulically actuated plunger for removing said detent from said aperture to permit rotation of said star wheel, means for supplying pressure to said plunger, an unloading valve associated with said plunger operable in response to a predetermined initial rotation of said star wheel to cause release of pressure on said plunger, a push rod for opening said unloading valve, and cam means formed on said star wheel and engageable with an end of said push rod to effect opening of said unloading valve upon a predetermined rotation of said star wheel.

7. A piston actuating mechanism for an article handling and working apparatus including a source of hydraulic pressure, a piston, a piston control valve directing pressure to one side or the other of said piston in accordance with the position of said control valve to effect reciprocation of said piston, resilient means associated with said control valve for moving said valve to a first position whereby pressure is directed to one side of said piston, piston means associated with said control valve for shifting said control valve to a second position whereby pressure is applied to an opposite side of said piston, means for applying hydraulic pressure to said piston means, and a bypass valve for unloading the pressure on said piston means at the end of a stroke of said piston in one direction, said bypass valve including means hydraulically balancing said valve whereby the same is unaffected by pressure on said piston means until the same is mechanically moved by said piston at the end of said stroke in one direction.

8. A piston actuating mechanism for an article handling and working apparatus including a source of hydraulic pressure, a piston, a piston control valve directing pressure to one side or the other of said piston in accordance with the position of said control valve to effect reciprocation of said piston, resilient means associated with said control valve for moving said valve to a first position whereby pressure is directed to one side of said piston, piston means associated with said control valve for shifting said control valve to a second position whereby pressure is applied to an opposite side of said piston, means for applying hydraulic pressure to said piston means, a bypass valve for unloading the pressure on said piston means at the end of a stroke of said piston in one direction, said bypass valve further including means hydraulically balancing the same to the pressure on said piston means whereby the same is unaffected by said pressure until the same is mechanically unloaded by said piston at the end of said one stroke in one direction, and means incorporating a separate pressure supply system operated by said piston upon its stroke in the reverse direction effective to terminate the supply of hydraulic pressure to said piston means.

9. A piston actuating mechanism in accordance with claim 8 wherein said bypass valve is arranged to close automatically upon a termination of the supply of pressure thereto.

10. A piston actuating mechanism for an article handling and working apparatus including a source of hydraulic pressure, a piston, a piston control valve directing pressure to one side or the other of said piston in accordance with the position of said control valve to effect reciprocation of said piston, resilient means associated with said control valve for moving said valve to a first position whereby pressure is directed to one side of said piston, piston means associated with said control valve for shifting said control valve to a second position whereby pressure is applied to an opposite side of said piston, means including a second control valve for applying hydraulic pressure to said piston means, first resilient means associated with said second control valve for urging said valve to a first operating position wherein it is ineffective for applying said hydraulic presssure to said piston means, second resilient means associated with said second control valve for shifting said valve to a second operating position wherein it is effective for applying said hydraulic pressure to said piston means, means for rendering said second resilient means ineffective to shift said second control valve, said second resilient means being selected to exert a substantially greater shifting force on said valve than said first resilient means, and a bypass valve for unloading the pressure on said piston means at the end of a stroke of said piston in one direction, said bypass valve including means hydraulically balancing said valve whereby the same is unaffected by pressure on said piston means until the same is mechanically moved by said piston at the end of said stroke in one direction.

11. A piston actuating mechanism for an article handling and working apparatus including a source of hydraulic pressure, a piston, a piston control valve directing pressure to one side or the other of said piston in accordance with the position of said control valve to effect reciprocation of said piston, resilient means associated with said control valve for moving said valve to a first position whereby pressure is directed to one side of said piston, piston means associated with said control valve for shifting said control valve to a second position whereby pressure is applied to an opposite side of said piston, means including a second control valve for applying hydraulic pressure to said piston means, first resilient means associated with said second control valve for urging said valve to a first operating position wherein it is ineffective for applying said hydraulic pressure to said piston means, second resilient means associated with said second control valve for shifting said valve to a second operating position wherein it is effective for applying said hydraulic pressure to said piston means, means for rendering said second resilient means ineffective to shift said second control valve, said second resilient means being selected to exert a substantially greater shifting force on said valve than said first resilient means, a bypass valve for unloading the pressure on said piston means at the end of a stroke of said piston in one direction, said bypass valve further including means hydraulically balancing the same to the pressure on said piston means whereby the same is unaffected by said pressure until the same is mechanically unloaded by said piston at the end of said one stroke in one direction, and means incorporating a separate pressure supply system operated by said piston upon its stroke in the reverse direction effective to terminate the supply of hydraulic pressure to said piston means.

References Cited in the file of this patent

UNITED STATES PATENTS

| | | |
|---|---|---|
| 164,456 | Hutchison | June 15, 1875 |
| 213,435 | Cameron | Mar. 18, 1879 |
| 335,855 | Toole | Feb. 9, 1886 |
| 590,862 | Severy | Sept. 28, 1897 |
| 1,329,553 | Seator | Feb. 3, 1920 |
| 1,378,625 | Seator | May 17, 1921 |
| 1,921,092 | Newton | Aug. 8, 1933 |
| 2,040,990 | Haas | May 19, 1936 |
| 2,644,283 | Rogers | July 7, 1953 |